United States Patent
Puthuff et al.

Patent Number: 6,021,207
Date of Patent: Feb. 1, 2000

[54] WIRELESS OPEN EAR CANAL EARPIECE

[75] Inventors: Steven H. Puthuff, Saratoga; Vincent Pluvinage, Atherton; Jon C. Taenzer, Los Altos, all of Calif.

[73] Assignee: Resound Corporation, Redwood City, Calif.

[21] Appl. No.: 08/833,068

[22] Filed: Apr. 3, 1997

[51] Int. Cl.⁷ .................................................. H04R 25/00
[52] U.S. Cl. .......................... 381/330; 381/315; 381/328; 455/575; 379/52
[58] Field of Search ..................................... 381/330, 328, 381/322, 327, 312, 316, 321, 60, 314, 315, 320, 323, FOR 127, FOR 129, 370, 380, 381, 382, 375; 455/66, 90, 575; 379/52, 430

[56] References Cited

U.S. PATENT DOCUMENTS

| | | | |
|---|---|---|---|
| 2,874,231 | 2/1959 | Wallace | 381/328 |
| 3,068,954 | 12/1962 | Strzalkowski | 381/328 |
| 3,201,528 | 8/1965 | Johanson et al. | 381/330 |
| 3,209,080 | 9/1965 | Guttner | 381/330 |
| 4,291,203 | 9/1981 | Bellafiore | 381/330 |
| 5,031,219 | 7/1991 | Ward et al. | 381/328 |
| 5,068,902 | 11/1991 | Ward | 381/328 |
| 5,553,312 | 9/1996 | Gattey et al. | |
| 5,590,417 | 12/1996 | Rydbeck. | |
| 5,721,783 | 2/1998 | Anderson | 381/328 |
| 5,737,436 | 4/1998 | Boyden | 381/330 |
| 5,761,319 | 6/1998 | Dar et al. | 381/330 |
| 5,812,680 | 9/1998 | Glendon | 381/328 |

Primary Examiner—Huyen Le
Attorney, Agent, or Firm—Burns, Doane, Swecker & Mathis, L.L.P.

[57] ABSTRACT

A communications earpiece is disclosed which can be used by hearing impaired and non-hearing impaired users so as to be able to communicate with an external device such as personal communications node or cellular phone via a wireless link. A communications earpiece comprises an ear canal tube sized for positioning in an ear canal of a user so that the ear canal is at least partially open for directly receiving ambient sounds. A sound processor amplifies the received ambient sounds to produce a processed analog signal. The processed analog signal is then converted into digital signals and transmitted to a remote unit via a wireless link. The earpiece also receives signals from the remote unit which are then processed and applied to a speaker in the earpiece.

29 Claims, 7 Drawing Sheets

WIRELESS OPEN EAR CANAL EARPIECE

BACKGROUND OF THE INVENTION

1. Field of the Invention

The present invention relates to an open ear canal earpiece, and more particularly to an open ear canal earpiece which is capable of communicating with external devices over a wireless link.

2. State of the Art

The telecommunications industry has been in a rapid growth state for the past decade. The result of such growth has been the proliferation of communications systems, e.g., telephones, cellular phones, and computer networks, and thus the ability to contact someone when they are away from the house or the office. With the increase in cellular phones, there has been a demand for hands free methods of communicating either via a cellular phone or by a regular phone. One such method is a headset with a boom microphone. The headset can either have one or two earpieces which fit over the ear and a boom mike which is attached to the earpiece assembly and extends out in from the user's mouth. The headset is either secured by resting on the head or is secured by being attached behind the ear. The problem with this assembly is that it is cosmetically unattractive and uncomfortable to wear for long periods of time. Furthermore, it is large, highly visible, cumbersome, and unsuitable for hands free operation while driving or walking.

Another problem with the traditional headset and boom mike assemblies is that these assemblies do not modify the voice signals in the earpiece so as to allow for the correction of various hearing impairments. Conventional hearing aids are typically employed that are configured to fit either behind the ear or in the ear. Through various signal processing techniques, sounds to be delivered to the ear are processed to facilitate and optimize the hearing of the user throughout the usable audible frequency range. However, these devices block the ear canal so that little or no sounds reach the ear in a natural, unaided manner. Furthermore, such devices have drawbacks, such as feedback, when used with communication devices such as telephones.

Conventional hearing aids generally provide adequate processing throughout the necessary frequency range for most hearing impairments. However, these types of devices are not optimal for people having mild hearing losses for a number of reasons. Conventional hearing aids can unnecessarily amplify loud sounds so that these sounds become uncomfortable and annoying to the mild hearing loss users. In many hearing aids, such loud sounds are also distorted by the sound processing circuitry, significantly reducing the intelligibility of speech or the quality of other sounds. In addition, these types of hearing aids often introduce phase shifts to received sounds, resulting in a reduction of the user's ability to localize sound sources. These hearing aids can therefore degrade certain sounds that the mild hearing loss user could otherwise hear adequately without any aid. Conventional hearing aid systems cause a problem known as the occlusion effect. The occlusion effect is the increased loudness of low frequency sounds due to transmission of sound by tissue conduction when the ear canal is blocked and air conduction is impeded, resulting in sounds which are both unnatural and uncomfortable for the user. Additionally, these traditional hearing aids are overly complicated and burdensome to users having mild hearing losses.

Thus, there is a need for a communications earpiece which allows for hands free communication through a cellular phone or other two-way communications device which is unobtrusive and cosmetically attractive. At the same time, the earpiece would need to leave the ear canal at least partially open to allow the users with mild hearing impairment or no hearing impairment to receive ambient sounds via the ear canal. Furthermore, the earpiece should be capable of providing modifications to the sounds produced by the earpiece so as to compensate for any hearing impairment.

SUMMARY OF THE INVENTION

The present invention is directed to a communications earpiece which can be used by hearing impaired and non-hearing impaired users so as to be able to communicate with an external device, e.g., external communication networks. A communications earpiece comprises an ear canal tube sized for positioning in an ear canal of a user so that the ear canal is at least partially open for directly receiving ambient sounds without amplification. A sound processor is also provided to process the received ambient sounds to produce a processed analog signal. The processed analog signal is then converted into digital signals and transmitted to a remote unit via a wireless link. The earpiece also receives signals from the remote unit which are then processed and applied to a speaker in the earpiece. The received processed signals can also be used to create noise cancellation and/or enhance the use of the earpiece as a communications product.

According to an alternate embodiment, the communications earpiece is configured to fit entirely in the ear wherein the ear canal is at least partially open for receiving ambient sounds.

BRIEF DESCRIPTION OF THE DRAWINGS

These and other objects may be fully understood through the description below and the accompanying drawings, in which.

DETAILED DESCRIPTION OF THE PREFERRED EMBODIMENTS

Figure 1:
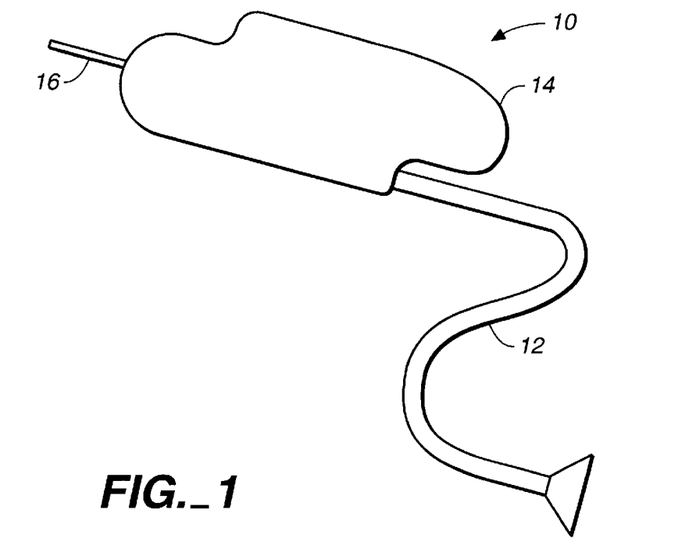
FIG. 1 illustrates a wireless open ear canal earpiece according to an exemplary embodiment of the present invention.

FIG. 1 illustrates a wireless open ear canal earpiece which can be used as a hearing aid/communications device. The earpiece 10 is comprised of three main parts: an ear tube 12, a processing section 14, and an antenna 16 which can be used to communicate with other electronic devices as will be described below.

Figure 2:
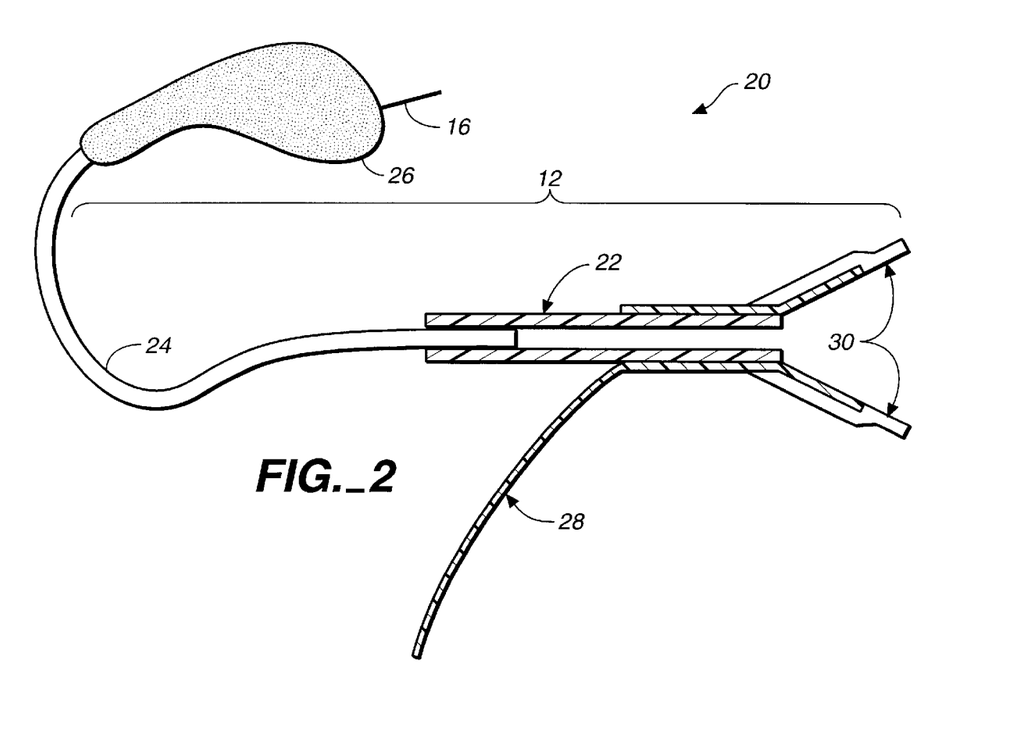
FIG. 2 illustrates a open ear canal earpiece.

FIG. 2 provides a more detailed view of the ear tube section 12. The open ear canal earpiece system 20 includes an ear canal tube 22 sized for positioning in the ear of a user so that the ear canal is at least partially open for directly receiving ambient sounds. The ear canal tube 22 is connected to an earpiece tube 24. This connection can be made by tapering the ear canal tube 22 so that the earpiece tube 24 and the ear canal tube 22 fit securely together. Alternatively, a connector or the like can be used for connecting the ear canal tube 22 and the earpiece tube 24, or the earpiece tube 24 and the ear canal tube 22 can be incorporated into a single tube. The earpiece tube 24 is also connected to a case 26. The case 26 encloses a sound processing device, speaker and a microphone as will be described with reference to FIG. 3. An example of such an open ear canal earpiece is disclosed in U.S. patent application Ser. No. 08/781,714, (Attorney Docket No. 022577-297) entitled "Open Ear Canal Hearing Aid System", filed Jan. 10, 1997, the contents of which are hereby incorporated by reference in its entirety.

FIG. 2 further illustrates a barb 28 that can be attached to one side of the ear canal tube 22. The barb 28 extends outward from the ear canal tube 22 so that it lodges behind the tragus to keep the ear canal tube 22 properly positioned in the ear canal. The barb 28 can be made of soft material, (e.g., rubber like material), so as not to scratch the ear tissue. At the end of the ear canal tube 22, the tip 30 can be soft so that the ear canal wall does not become scratched.

The tube 22 can be formed to the contour of the ear and can be made of a material that has some stiffness (e.g., plastic or other material). This makes the whole assembly, including the case 26, the tubes 22 and 24, the barb 28, and the tip 30, work as a unit to maintain the earpiece in position. The tube 22 can be made flexible enough to allow the tip of the earpiece to be inserted and removed easily from the ear.

Figure 3:
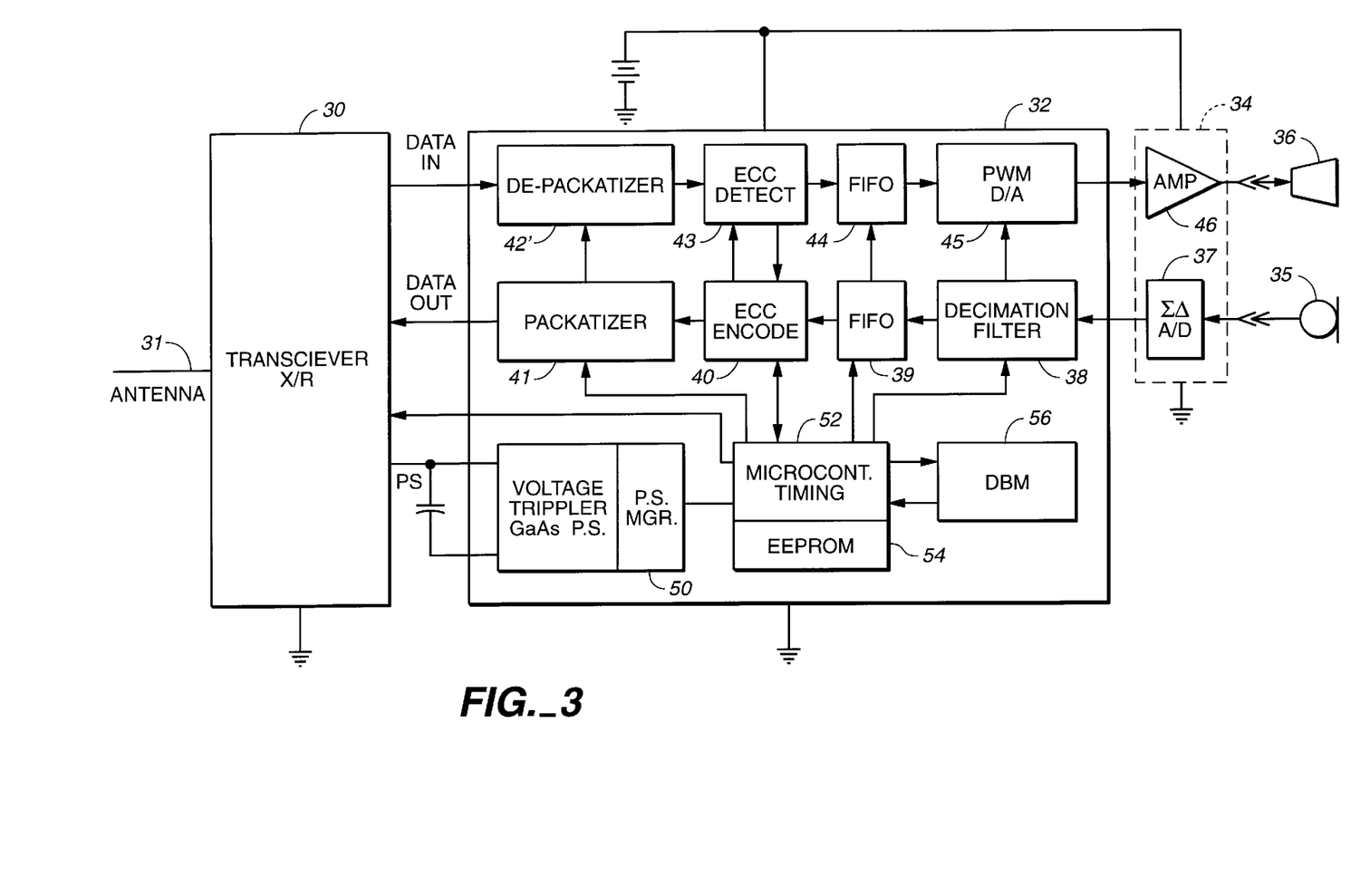
FIG. 3 is a block diagram of a wireless open ear canal earpiece according to an exemplary embodiment of the present invention.

The case 26 employs circuitry to transmit signals to and receive signals from a remote unit such as a personal communication node or a cellular phone. A hearing aid with wireless remote processor is disclosed in U.S. application Ser. No. 08/479,629, which is incorporated herein by reference. As illustrated in FIG. 3, the processing performed by the earpiece can be divided into three main sections: a transceiver 30; a custom I/C digital control chip 32; and an analog chip 34. The transceiver 30 is connected to an antenna 31. According to one embodiment of the present invention, the transceiver 30 can be a gallium arsenide transceiver operating at 5.8 GHz and the antenna can be tuned to a quarter of a wavelength which results in the antenna being approximately half an inch long. The custom integrated digital controller chip 32 performs all of the digital functions needed to control the wireless link between the transceiver and the external device and also performs packetizing, depacketizing the data, error correction coding, etc. The digital controller chip 32 can also perform the digital functions pertaining to analog-to-digital conversion. The analog chip 34 is connected to a microphone 35 and a speaker 36. When the microphone 35 picks up a signal, the signal is sent into a sigma-delta A-to-D modulator 37. The modulator 37 outputs a serial stream of digitized data at a very high frequency. The data stream is sent into a decimation filter 38 which is a digital filter which extracts from the data stream, at a lower clock rate, a parallel set of bits which represent the individual samples. In this embodiment, the analog and digital parts of the analog-to-digital conversion has been divided so that the analog part is performed by the analog chip and the digital part is performed by the digital chip. It will be understood by those skilled in the art that the A-to-D conversion can be performed in other ways or without separating the analog and digital parts and the present invention is not limited thereto. The samples from the decimation filter 38 are buffered in a FIFO 39 wherein the samples are usually from 8 to 16 bits deep depending upon the depth of the A-to-D converter. The signal is then encoded with error correction coding bits in the error correction coding encoder 40. The encoder 40 adds bits to the bit stream to be transmitted which represent redundant information about the data being transmitted. The redundancy allows the other end of the link, the processing in the external device, to overcome errors which might occur in the wireless link due to interference and signal dropouts. The encoded signal is then packetized in a packetizer 41 to add necessary overhead bits for header and trailer information, stop bits, sync bits, address bits, etc. This information is needed to handle the link properly. The packetized data is then sent to the transceiver 30 which transmits the information to the remote device.

When the transceiver 30 receives data, the data is sent to a depacketizer 42. The data stream is then sent to the error correction coding detector 43 which removes any errors which occur during transmission by checking the error correction coding. The decoded signals are then buffered in a FIFO 44. The digital data stream is then converted back into an analog signal using a D/A convertor which can be, for example, pulse width modulation in the modulator 45. An analog signal is then produced from the modulator 45 and is applied to an amplifier 46 which drives the speaker 36.

The digital control chip can contain a power supply for providing power to the controller chip and the transceiver 30. In addition, the controller chip 32 can also contain a power supply manager 50 which maximizes battery life by turning off or putting to sleep for specific periods of time parts of the system which are not needed. The controller chip 32 also contains a microcontroller timing processor 52 and associated memories 54 and 56.

The received and processed signals can also be used to create noise cancellation and/or enhance the use of the device as a communications product. Usually, noise picked up by the earpiece will be in one frequency range, for example, around 500 Hz while cogitative speech is in a second frequency range, for example over 1000 Hz. Thus, the earpiece can filter out signals in the 400–600 Hz range from the received signals. The resulting signals can then be amplified and inverted and sent to the speaker to be broadcast into the ear canal. The inverted signal will then cancel the noise component of the sound in the ear canal around 500 Hz. The earpiece can also use the noise cancellation techniques disclosed in U.S. patent application Ser. No. 08/832,508, (Attorney Docket No. 022577-365) entitled "Noise Cancellation Earpiece", the contents of which are incorporated herein by reference in their entirety and filed on even day herewith. In addition part of the signal received at the microphone can be processed and sent back to the speaker to help the user hear his/her own voice which can be partially distorted because the earpiece partially occludes the ear.

Figure 6:
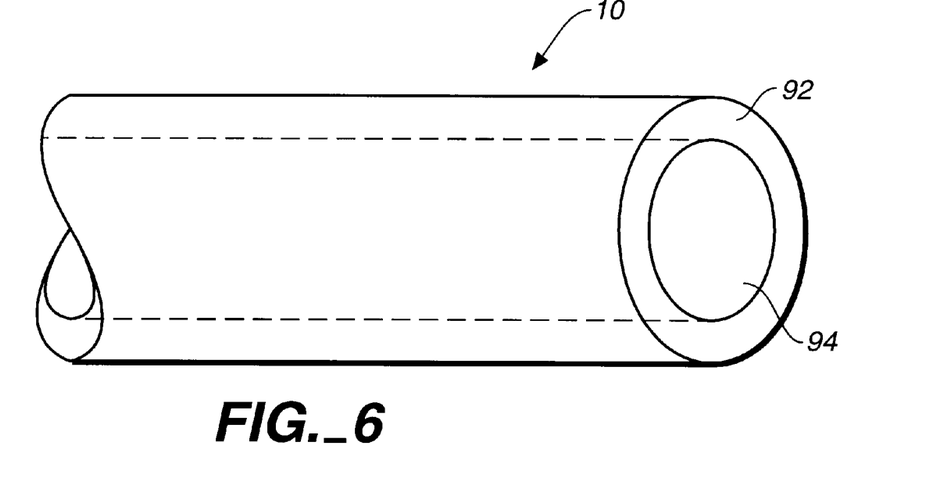
FIGS. 6–11 illustrate several earpiece systems according to exemplary embodiments of the present invention.

In the earpiece described above, all of the electronic components of the earpiece, e.g., including the microphone and speaker, are included in the behind-the-ear component of the earpiece. It will be understood by those skilled in the art that the earpiece can be configured to fit in the ear or ear canal so long as the canal is at least partially open for receiving ambient sounds. For example, the earpiece 90 can be shaped like an open cylinder with thick walls 92, wherein the opening 94 in the middle of the cylinder allows ambient sound to enter the ear canal and all of the electrical components are located in the walls of the cylinder, as illustrated in FIG. 6, but the invention is not limited thereto.

Figure 7:
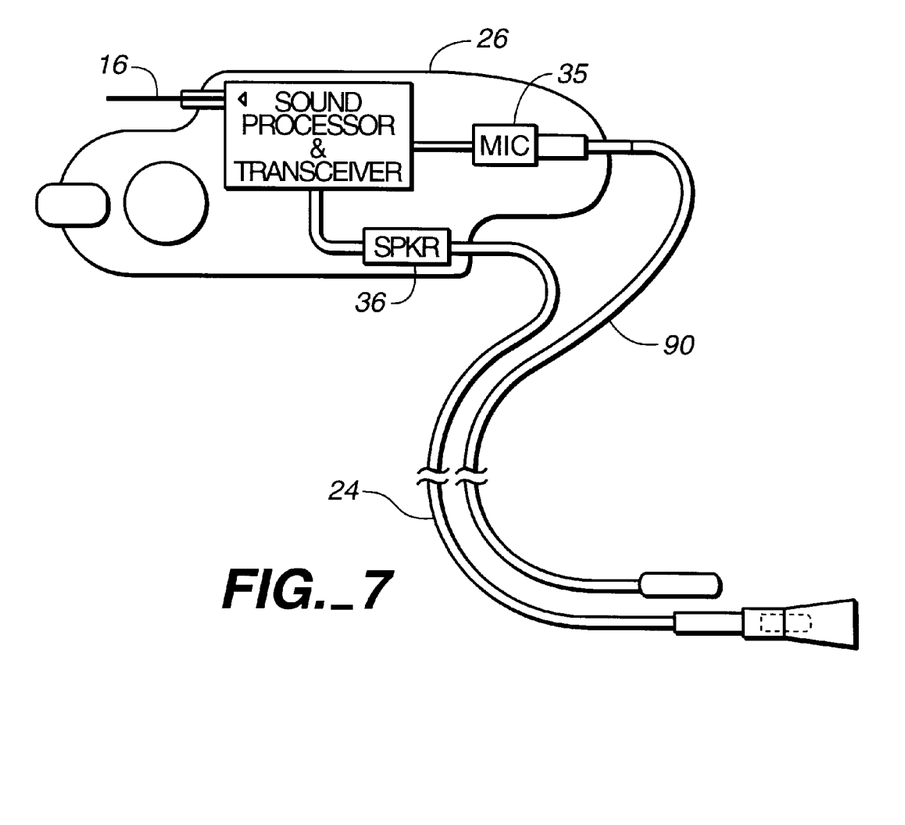
Figure 8:
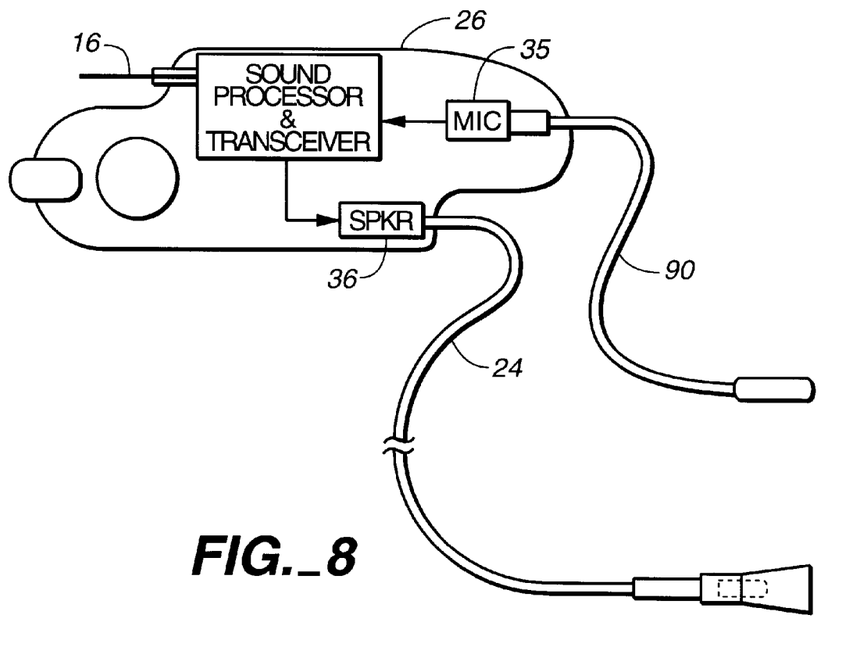
Figure 9:
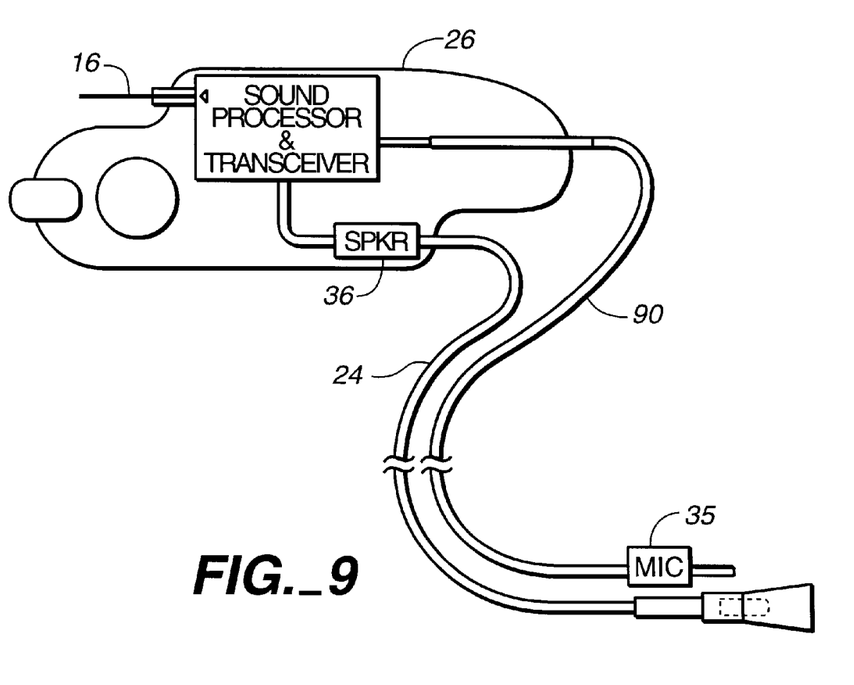
Figure 10:
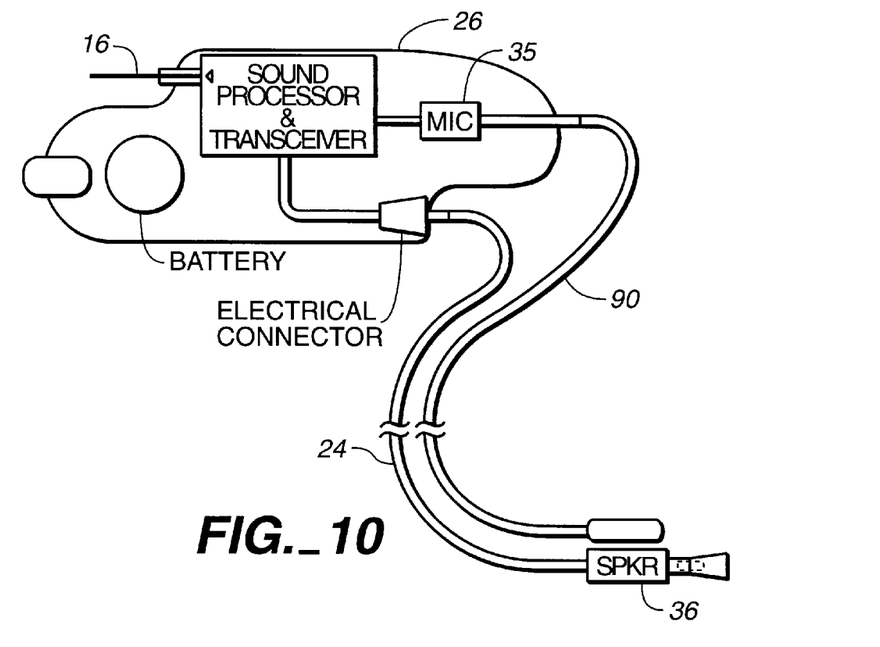
Figure 11:
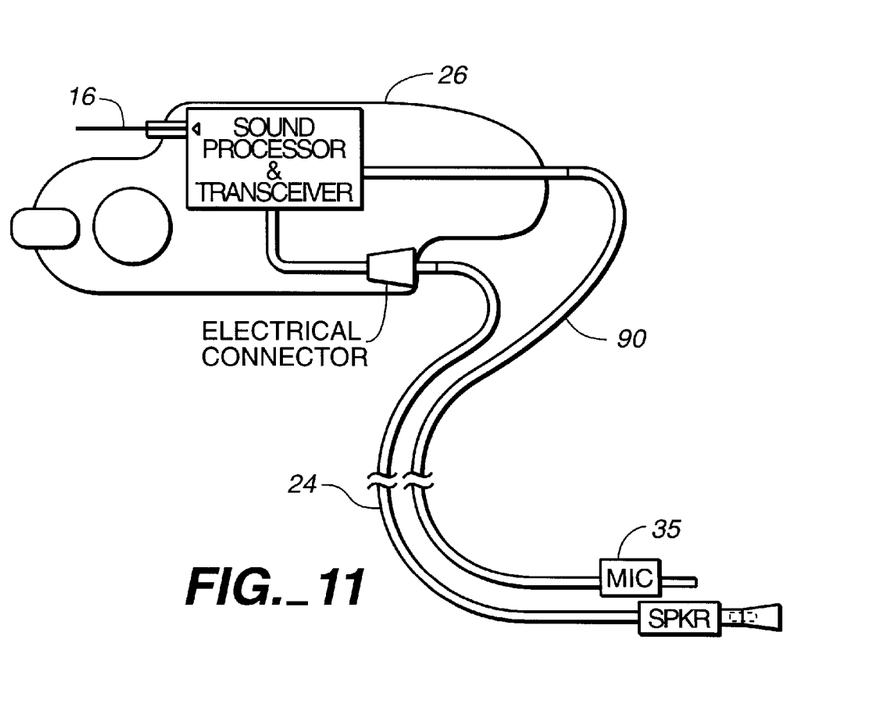

According to several alternative embodiments, the microphone and speaker can be placed in various locations outside of the BTE component. This improves the quality of the sound that is picked up by the microphone, particularly the voice of the user, with the ear serving as a natural filter. According to one embodiment illustrated in FIG. 7, a tube 90 is inserted into the input of the microphone 35 and the tube is extended into the ear canal of the user. The open end of the tube 90 located at the ear canal allows sounds in the ear canal to enter the tube and propagate to the input of the microphone 35. Alternatively, the tube 90 could extend from the microphone 35 but be located outside the ear canal to reduce the feedback caused by sounds from the speaker being picked up by the microphone 35, as illustrated in FIG. 8. In another embodiment illustrated in FIG. 9, rather than using a tube to deliver the sound to an input of the microphone 35, the microphone 35 can be moved from the case 26 to the end of the ear canal tube 90 located in the ear canal. In this embodiment, outputs from the microphone are transferred electronically via a wire contained in the ear tube 90 to the case 26 for processing. Likewise, as illustrated in FIG. 10, the speaker can be moved from the case 26 to the ear canal tube. Finally, both the microphone and the speaker of the behind-the-ear component are moved into the in-the-canal device wherein four wires (two for the microphone and two for the speaker) pass through one or more tubes to the electronic signal processing components located in the case 26, as illustrated in FIG. 11. It will be understood by those skilled in the art that the microphone and speaker can also be located anywhere between the case 26 and the end of the ear canal tube(s).

Figure 4A:
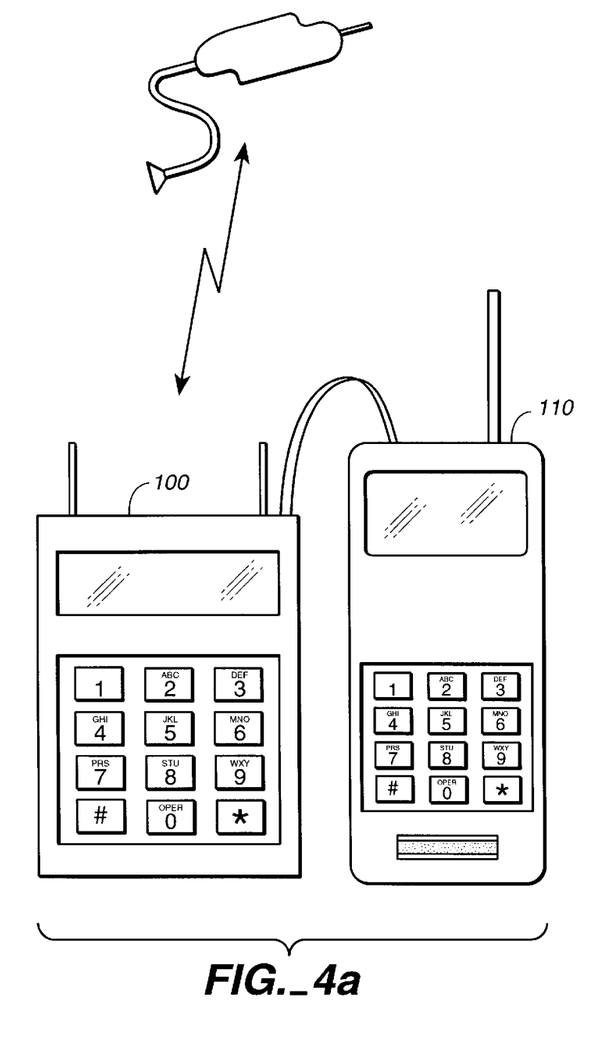
FIGS. 4(a)–(b) illustrate the inventive earpiece being attached to several external devices according to an exemplary embodiment of the present invention.
Figure 4B:
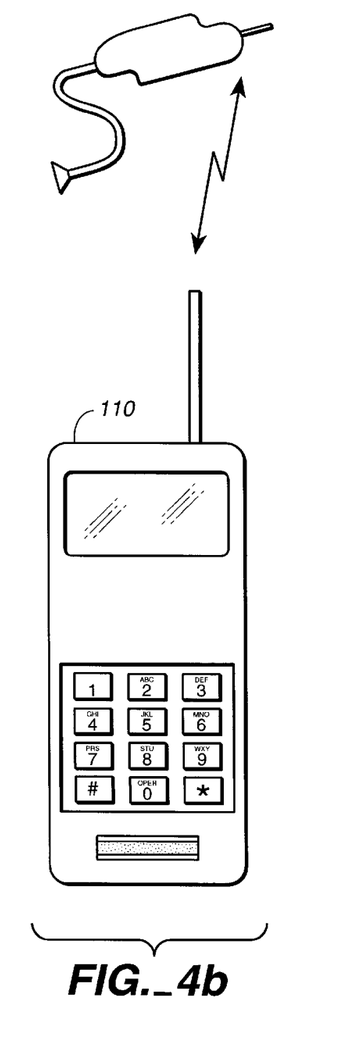

As mentioned above, the earpiece can communicate with a cellular phone or a personal communications node (PCN) via a wireless link as illustrated in FIGS. 4(a)–(b). An exemplary personal communications node is described in U.S. patent application Ser. No. 08/758,365, filed Dec. 3, 1996, entitled "Personal Communication Device", the contents of which are incorporated herein by reference in their entirety. Although only one earpiece is shown, one skilled in the art would appreciate that it may be desirable for the user to wear two earpieces. FIG. 4(a) illustrates a personal communication node according to an exemplary embodiment of the present invention. For illustrative purposes, the PCN 100 is depicted in FIG. 4(b) as connected to a cellular telephone 110 adapted for connection directly to the PCN 100. The PCN 100 permits a user to control at least one remote device simply by issuing voice commands. PCN 100 recognizes and interprets the voice commands of the user, determines whether the commands are to be sent to a given remote device to which it is connected, and forwards the voice commands to the appropriate remote device, accordingly. For example, the PCN 100 can be connected directly to a cellular phone 110 that is adapted for connection to the PCN. The cellular phone 110 can be used in a normal manner by entering codes via a keypad or in response to voice commands forwarded by the PCN 100. It will be understood by one skilled in the art that a cellular phone without a keypad or display could be used instead, and controlled solely by voice commands. Using the PCN 100 connected to the cellular telephone 110, a user can answer calls, initiate calls, receive or send messages and so on, simply by issuing voice commands. Likewise, the PCN can also be hooked up to other electronic devices such as computers, which can be controlled using the voice commands.

Figure 5:
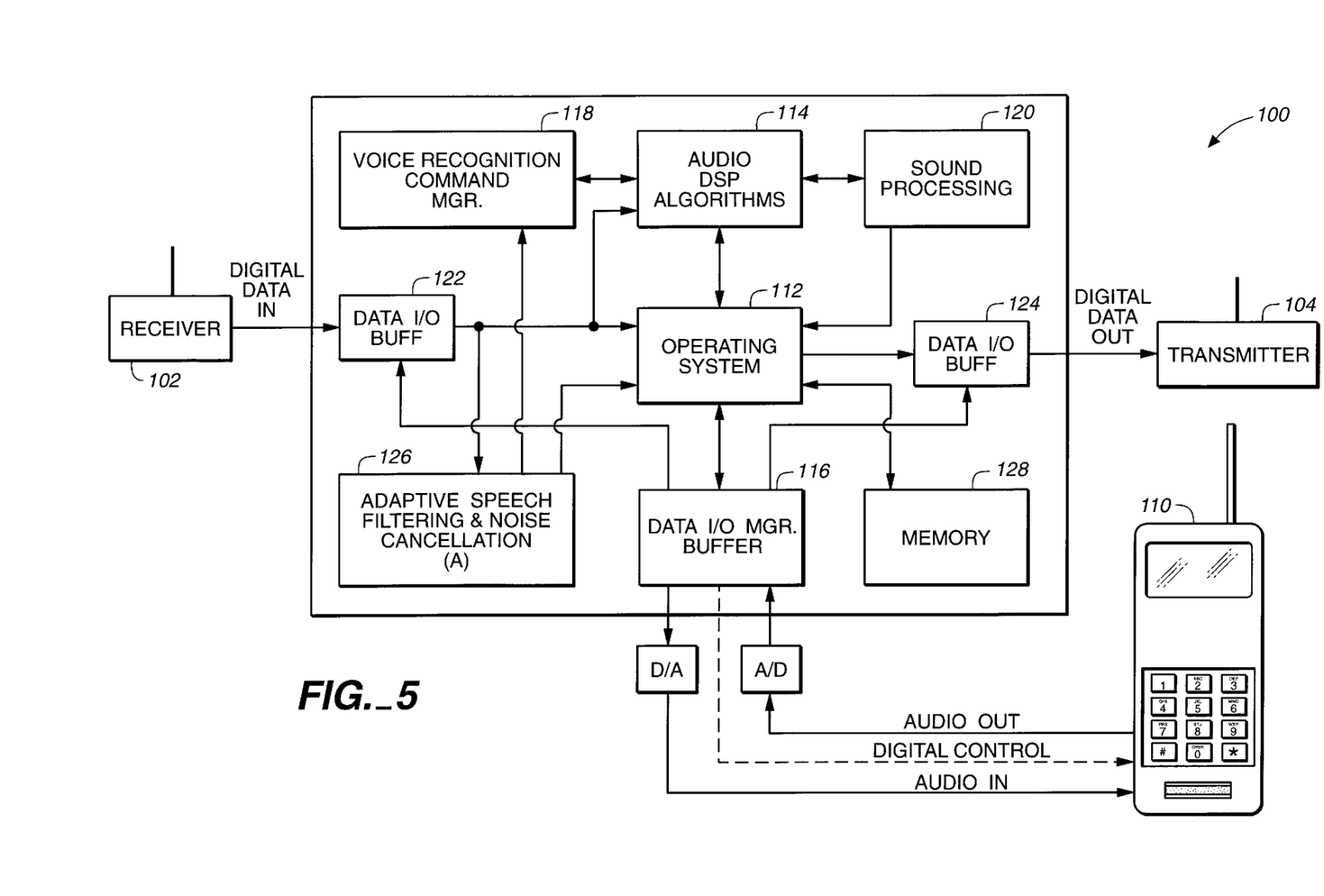
FIG. 5 illustrates a block diagram of a remote processing unit which is used in conjunction with the present invention.

Referring to FIG. 5, the PCN 100 processes signals received from the earpiece worn by the user via a speaker 102 including voice commands to control the cellular telephone 110 as well as voice data to be conducted over the cellular telephone network, and transmits appropriate signals to the cellular telephone 110. The PCN 100 also processes signals from the telephone 110 and transmits these signals via the transmitter 104 to the earpiece. To perform these functions, the PCN 100 includes a operating system 112, audio digital signal processing (DSP) algorithms 114, a data input/output (I/O) manager buffer 116, a voice recognition command manager 118, a sound processing system 120, data I/O buffers 122 and 124, an adaptive speech filtering and noise cancellation unit 126, and a memory unit 128 and/or any combination or subcombination of these components.

The operating system 112 includes software for scheduling software tasks, handling interrupt request scheduling, data input/output, and allocating memory for various applications in the PCN 100. The sound processing unit 120 includes basic software used, for example, in a hearing aid to enhance signal understanding and intelligibility. The sound processing unit 120 can be implemented with a remote processor, such as that described in copending U.S. patent application Ser. No. 08/479,629, the contents of which are incorporated herein by reference in their entirety. The sound processing unit 120 can also perform the noise cancellation mentioned above.

The sound processing system 120 can also be programmed to modify the received signals to compensate for several problems. First of all, different types of cellular phones have different amplitude levels at the headset jack to which the PCN node will be connected. In order for the PCN and the earpiece to be able to properly communicate with the cellular phone through the headset jack, the amplitude levels of the PCN and the cellular phone need to match. Thus, the sound processing system needs to be able to adjust the gain on the signals travelling between the PCN and cellular phone until the gain of the signals match. This allows the PCN to be connected to different types of cellular phones and maintain compatibility.

In cellular phones, the voice of the user is picked up by the microphone and a portion of the voice signal is fed back to the earpiece so that the user can hear his own voice on the phone. When the inventive earpiece is used with a cellular phone, a portion of the user's voice fed back from the cellular phone is sent to the speaker in the earpiece which broadcasts the signal into the ear canal. If the signal is very strong, or the speaker and the microphone are very close together, a feedback loop will be created because the microphone will pick up the fed back signal which can result in a whistling noise. Another feedback problem occurs if there is a delay in the transmission link between the two users. During a conversation, the voice of the other person will come into the ear canal of the earpiece user, but at the same time the voice is picked up by the microphone which sends the voice back to the other user. If there is any delay in the transmission link, an echo will be created. In order to cancel out these feedback problems the sound processing system 120 can be programmed to also act as an anti-feedback device to prevent feedback in the earpiece.

The voice recognition command manager 118 includes software which interprets voice commands from the user. For example, a voice command can be interpreted as a command to direct the cellular telephone 110 to perform a certain function. The voice recognition command manager 140 can be implemented within a conventional voice recognition software such a Motorola's Lexicus Microbrain or the Voice Dialer, model VCS 2060 of Voice Control Systems, Inc. in Dallas, Tex. The voice recognition command manager 140 is trained ahead of time during a set-up phase to recognize the voice of a specific user. For example, the user simply speaks a series of selected words, and the voice recognition command manager 118 becomes programmed, i.e., trained, in a known fashion to recognize any word spoken by the user based on these selected words. The voice recognition command manager 118 can, for example, be language independent.

The voice command manager 118 matches a voice command to a particular control function in a library or lookup table of memory 128. After matching the voice command to a particular control function and a particular remote device, the voice recognition command manager 118 can issue an appropriate control code to, for example, control gating of commands and/or data to one or more remote devices via the operating system.

The audio DSP algorithms unit 114 provides digital sound processing algorithms for the voice recognition command manager 118 in the sound processing unit 120 under the control of the operating system 112. The audio DSP algorithms unit 114 can be implemented in accordance with features described in U.S. Pat. No. 5,479,522 to Linderman et al., the contents of which are hereby incorporated by reference in their entirety. The audio DSP algorithm unit 114 can also provide noise cancellation algorithms for the sound processing unit 120.

The data I/O manager buffer 116 temporarily stores data, voice, and control signals. The personal communication device also includes an adaptive speech filtering and noise cancellation unit 126 which enhances signal quality by filtering and cancelling noise in the signal. The adaptive speech filtering and noise cancellation unit 126 can be implemented in accordance with, for example, U.S. Pat. No. 5,140,640 to Graupe et al. and/or U.S. Pat. No. 5,452,361 to Jones entitled "Reduced VLF Overload Susceptibility Active Noise Cancellation Headset" assigned to Noise Cancellation Technology (NCT), the contents of which are incorporated herein by reference in their entireties.

It will be appreciated by those of ordinary skill in the art that the present invention can be embodied in other specific forms without departing from the spirit or essential character thereof. The presently disclosed embodiments are therefor considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A communications earpiece, comprising:
   an ear canal tube sized for positioning in an ear canal of a user so that the ear canal is at least partially open for directly receiving ambient sounds;
   a sound processor for processing ambient sounds received by a microphone to produce processed signals;
   means for transmitting said processed signals to at least one remote unit over a wireless link; and
   means for receiving signals from said remote unit which are processed and applied to a speaker in said earpiece and broadcast into the ear canal by said ear canal tube.

2. A communications earpiece according to claim 1, wherein said remote unit is a personal communications node.

3. A communications earpiece according to claim 2, wherein said personal communications node includes means for manipulating signals to correct for hearing impairment.

4. A communications earpiece according to claim 2, wherein said personal communications node prevents feedback in said earpiece.

5. A communications earpiece according to claim 2, wherein said personal communications node can perform the operations of a two-way communications.

6. A communications earpiece according to claim 2, wherein said personal communications node connects to a two-way communications device so as to allow signals to pass between the earpiece and the two-way communications device.

7. A communications earpiece according to claim 6, wherein said personal communication node adjusts the gain of signals sent to said two-way communications device and received from said two-way communications device so that the personal communications node and said two-way communications device are compatible.

8. A communications earpiece according to claim 6, wherein said two-way communications device is a cellular phone.

9. A communications earpiece according to claim 1, wherein said remote unit is a two-way communications device.

10. A communications earpiece according to claim 1, further comprising:
    a second ear canal tube, wherein a first end of said second ear canal tube is connected to the input of said microphone and a second end of said ear canal tube is open and is positioned near the ear canal, wherein ambient sounds enter said second end and propagate through the second ear canal tube to the input of the microphone.

11. A communications earpiece according to claim 1, wherein said speaker is located at one end of said first ear canal tube located in said ear canal and is electrically connected to said sound processor via wires in said first ear canal tube.

12. A communications earpiece according to claim 1, wherein said sound processor includes an analog-to-digital converter and wherein the transmitted processed signals are digital.

13. A communications earpiece according to claim 1, wherein said ambient sound is mixed with said signals from said remote unit in the ear canal of said user.

14. A communications earpiece according to claim 1, wherein said ear canal tube is at least partially open to directly pass ambient sound external of said ear canal to a tympanic membrane of the user.

15. A communications earpiece, comprising:
    an ear canal tube sized for positioning in an ear canal of a user so that the ear canal is at least partially open for directly receiving ambient sounds;
    a sound processor for processing ambient sounds received by a microphone to produce processed signals;
    means for transmitting said processed signals to at least one remote unit over a wireless link;
    means for receiving signals from said remote unit which are processed and applied to a speaker in said earpiece and broadcast into the ear canal by said ear canal tube; and
    a second ear canal tube, wherein a first end of said second ear canal tube is connected to the input of said microphone and a second end of said ear canal tube is open and is positioned near the ear canal, wherein ambient sounds enter said second end and propagate through the second ear canal tube to the input of the microphone, wherein said second end is located in said ear canal.

16. A communications earpiece comprising:
    an ear canal tube sized for positioning in an ear canal of a user so that the ear canal is at least partially open for directly receiving ambient sounds;

a sound processor for processing ambient sounds received by a microphone to produce processed signals;

means for transmitting said processed signals to at least one remote unit over a wireless link;

means for receiving signals from said remote unit which are processed and applied to a speaker in said earpiece and broadcast into the ear canal by said ear canal tube; and a second ear canal tube wherein the microphone is located at one end of said second ear canal tube in said ear canal and is electrically connected to said sound processor via wires in said second ear canal tube.

17. A communications earpiece according to claim 16, wherein said speaker is located at one end of said first ear canal tube located in said ear canal and is electrically connected to said sound processor via wires in said first ear canal tube.

18. A communications earpiece, comprising:

a sound processor for processing ambient sounds received by a microphone to produce processed signals;

means for transmitting said processed signals to at least one remote unit over a wireless link; and means for receiving signals from said remote unit which are processed and applied to a speaker in said earpiece and broadcast into the ear canal, said communications earpiece being configured for positioning in said ear of a user so that the ear canal is at least partially open for directly receiving ambient sounds.

19. A communications earpiece according to claim 18, wherein said remote unit is a personal communications node.

20. A communications earpiece according to claim 19, wherein said personal communications node includes means for manipulating signals to correct for hearing impairment.

21. A communications earpiece according to claim 19, wherein said personal communications node prevents feedback in said earpiece.

22. A communications earpiece according to claim 19, wherein said personal communications node can perform the operations of a two-way communications device.

23. A communications earpiece according to claim 19, wherein said personal communications node connects to a two-way communications device so as to allow signals to pass between the earpiece and the two-way communications device.

24. A communications earpiece according to claim 23, wherein said two-way communications device is a cellular phone.

25. A communications earpiece according to claim 24, wherein said personal communication node adjusts the gain of signals sent to said two-way communications device and received from said two-way communications device so that the personal communications node and said two-way communications device are compatible.

26. A communications earpiece according to claim 18, wherein said remote unit is a two-way communications device.

27. A communications earpiece according to claim 18, wherein said sound processor includes an analog-to-digital converter and wherein the transmitted processed signals are digital.

28. A communications earpiece according to claim 18, wherein said ambient sound is mixed with said signals from said remote unit in the ear canal of said user.

29. A communications earpiece according to claim 18, wherein said ear canal tube is at least partially open to directly pass ambient sound external of said ear canal to a tympanic membrane of the user.

* * * * *